United States Patent

Führer et al.

[11] Patent Number: 6,145,940
[45] Date of Patent: Nov. 14, 2000

[54] PROCESS FOR OPERATING A HYDRAULIC BRAKE SYSTEM

[75] Inventors: Jochen Führer, Darmstadt; Alexander Kolbe, Gross-Zimmern, both of Germany

[73] Assignee: ITT Manufacturing Enterprises, Inc., Wilmington, Del.

[21] Appl. No.: 09/043,956

[22] PCT Filed: Sep. 10, 1996

[86] PCT No.: PCT/EP96/04370

§ 371 Date: Jun. 25, 1998

§ 102(e) Date: Jun. 25, 1998

[87] PCT Pub. No.: WO97/13670

PCT Pub. Date: Apr. 17, 1997

[30] Foreign Application Priority Data

Oct. 12, 1995 [DE] Germany ............................ 195 37 926

[51] Int. Cl.[7] .................................................. B60T 8/34
[52] U.S. Cl. .................................. 303/113.4; 303/116.2; 303/191
[58] Field of Search .............................. 303/3, 7, 15, 10, 303/11, 113.2, 115.4, 115.5, 116.2, 116.3, 191

[56] References Cited

U.S. PATENT DOCUMENTS

| | | | |
|---|---|---|---|
| 5,472,264 | 12/1995 | Klein et al. | 303/3 |
| 5,683,149 | 11/1997 | Aizawa et al. | 303/10 |
| 5,743,598 | 4/1998 | Toda et al. | 303/11 |
| 5,845,974 | 12/1998 | Kamikado et al. | 303/115.2 |
| 5,967,629 | 10/1999 | Kubota | 303/186 |
| 5,992,952 | 11/1999 | Kubota | 303/191 |

FOREIGN PATENT DOCUMENTS

| | | |
|---|---|---|
| 3818260 | 12/1989 | Germany . |
| 3819490 | 12/1989 | Germany . |
| 3931307 | 3/1991 | Germany . |
| 4132470 | 4/1993 | Germany . |
| 4223602 | 1/1994 | Germany . |
| 4232132 | 3/1994 | Germany . |
| 4333568 | 4/1995 | Germany . |
| 92/18363 | 2/1992 | WIPO . |
| 94/27848 | 2/1994 | WIPO . |

*Primary Examiner*—Chris Schwartz
*Attorney, Agent, or Firm*—Rader, Fishman & Grauer PLLC

[57] ABSTRACT

In a hydraulic brake system which is appropriate for active braking operations, the condition that at least one of the low-pressure accumulators is completely emptied during active braking without the suction line from the suction side of the return pump to the brake line being open has to be prevented. Therefore, the current consumption and/or the rotational speed of the drive motor of the return pumps is sensed and evaluated. When the pump idles and the low-pressure accumulator is empty, the rotational speed rises and the current consumption drops. This signal is used to open an electrically operated change-over valve in the corresponding suction line. In addition, a memorized pattern can ensure that the electrically operated change-over valve is open already shortly before exhaustion of the low-pressure accumulator, with the result that the low-pressure accumulator is prevented from being completely emptied.

3 Claims, 1 Drawing Sheet

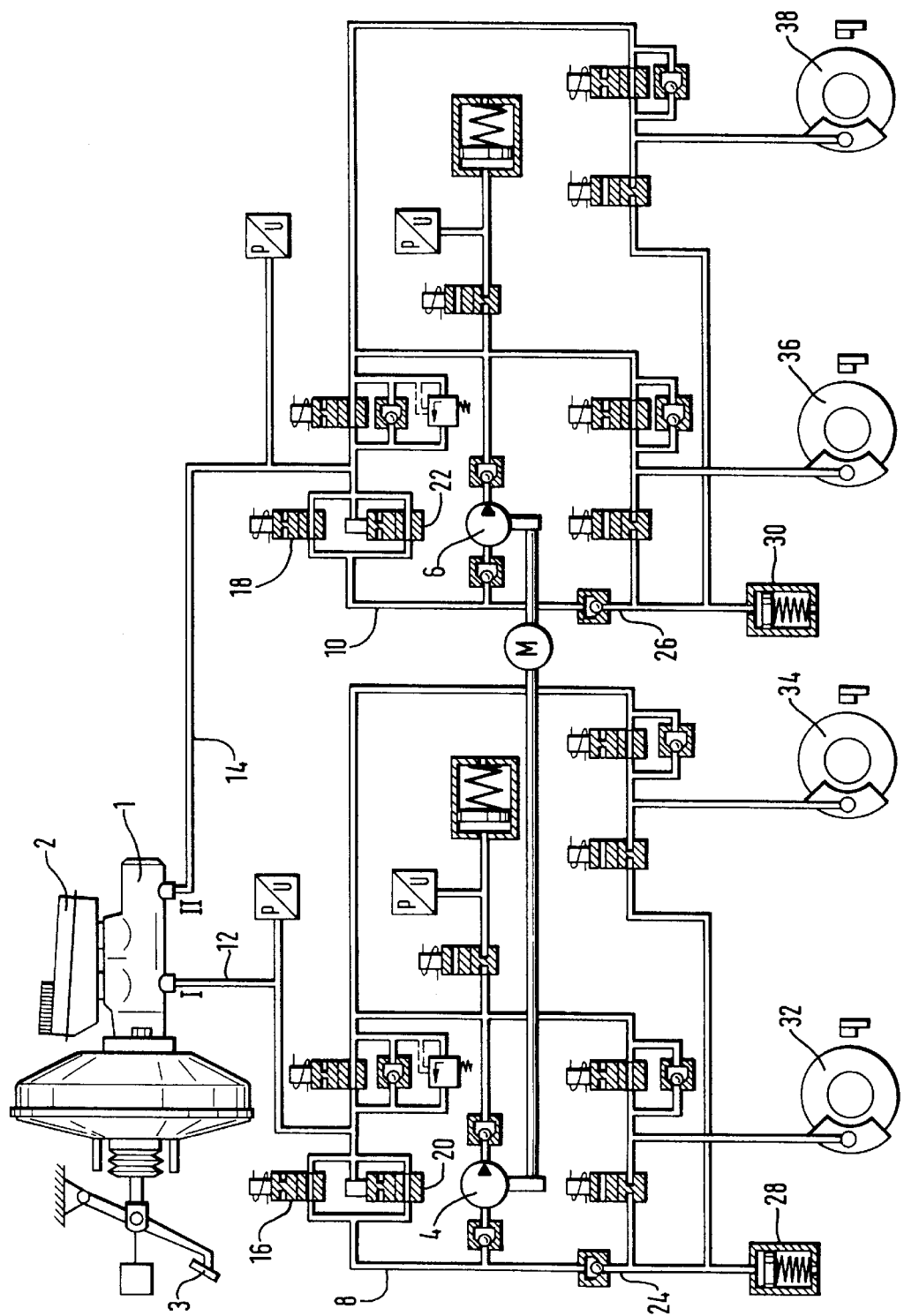

PROCESS FOR OPERATING A HYDRAULIC BRAKE SYSTEM

BACKGROUND OF THE INVENTION

The present invention relates to a method of operating a hydraulic brake system.

German patent application No. 43 33 568 discloses a brake system for which the mentioned method is appropriate. The prior art brake system is equipped for brake slip control according to the recirculation principle, for traction slip control on the wheel brakes of the driven wheels and for yaw torque control during cornering. 'Active braking' refers to both traction slip control and yaw torque control by brake management because brake management operations of this type may also be effected without the application of the brake pedal. Each brake circuit includes a recirculation cycle, and the return pump is of the self-priming type and has a suction line to the brake line. A separating valve which is being closed during active braking operations is interposed in the brake line between the port of the suction line and the port of the pressure line of the return pump. For a rapid pressure build-up, the brake system includes a high-pressure accumulator on the pressure side of the return pump which is connectable to the brake line by way of an electromagnetic two-way/two-position directional control valve. In the normal case, the return pump aspirates pressure fluid from the low-pressure accumulator connected to the outlet valves of the wheel brakes. The return pump delivers the fluid volume from the low-pressure accumulator into the brake line where it prevails upstream of the inlet valves of the wheel brakes. In contrast to brake slip control, this fluid volume is required during active braking for pressure build-up in the wheel brakes. The wheel brakes concerned are selected according to the basic control strategies, i.e., traction slip control or yaw torque control.

When the low-pressure accumulator is completely exhausted, the return pump can neither aspirate fluid volume, nor supply it into the brake line. Active pressure build-up in the wheel brakes of the brake circuit concerned becomes impossible. When a minimum filling level in the low-pressure accumulator is reached, the electric change-over valve arranged in the suction line to the brake line must be opened so that the return pump can aspirate fluid from the supply reservoir of the brake system by way of the master cylinder. During active braking operations, it is imperative to prevent an operating condition with a completely empty low-pressure accumulator and a closed electric change-over valve. So far, this problem has been overcome by a special travel switch which is provided on the low-pressure accumulator and issues a signal to open the electric change-over valve when the low-pressure accumulator is empty.

However, because additional component parts in a brake system always increase costs and failure of a travel switch involves a safety risk for the operation of the brake system, an object of the present invention is to provide a method of the initially mentioned type which obviates the need for additional components and ensures reliable opening of the electric change-over valve in the suction line between the suction side of the return pump and the brake line when the low-pressure accumulator is empty.

SUMMARY OF THE INVENTION

This object is achieved by determining a requirement of additional fuid by evaluating rotational speed and/or current consumption of the drive motor of the return pump.

The rotational speed signal of the drive motor of the return pump in brake systems of up-to-date design is sensed already for the purpose of monitoring the pump operation and, with a corresponding modification of the serial interfaces, could be used in addition for the purpose of monitoring the filling level of the low-pressure accumulator. The current consumption of the drive motor could be sensed equally simply when the electronic evaluating unit is designed accordingly.

For reasons of redundancy, the evaluation of the rotational speed or the current consumption could be taken into account by way of a memorized pattern only to protect a control system. The advantage is that the pump can generally be prevented from running empty for a brief interval even if the rotational speed monitoring system has not yet responded. This is because a memorized pattern will recognize already very early an imminent risk of exhaustion of the low-pressure accumulator.

The idea of the present invention will be explained more closely by way of the description of a method of the present invention, making reference to the accompanying drawing.

BRIEF DESCRIPTION OF THE DRAWING

The single FIGURE shows a brake system which permits implementing the method of the present invention.

DETAILED DESCRIPTION OF THE DRAWING

The illustrated brake system is known per se. The only purpose of its representation is to describe the method of the present invention. Therefore, functional elements are mainly mentioned with respect to their function.

The brake circuits I and II extend from the master cylinder 1 and have an identical design. The master cylinder 1 is connected to the supply reservoir 2 from which the self-priming return pumps 4 and 6 can aspirate pressure fluid when the brake pedal 3 is not applied. The brake system shown includes an electrically operated change-over valve 16 or 18 and, connected in parallel thereto, a hydraulically operated change-over valve 20 or 22 in each of the suction lines 8 and 10 which connect the suction sides of the return pumps 4 and 6 to the brake lines 12 and 14. The advantage of the parallel connection of the change-over valves 16 and 20 or, respectively, 18 and 22 in the suction lines 8 or 10 is that, when the brake pedal is not depressed, the hydraulically operated change-over valve is open in any case because it becomes closed by the braking pressure on the master cylinder side. However, the present invention permits being implemented also in brake systems where hydraulically operated change-over valves such as valves 20 and 22 are not provided but only electrically operated change-over valves similar to the change-over valves 16 and 18. Further, it is of no significance to the present invention whether the existing electrically operated change-over valves (as shown) are normally open or normally closed exactly as in other embodiments. The return pumps 4 and 6 are respectively connected to a low-pressure accumulator 28 or 30 by one further suction line 24 or 26 each. The low-pressure accumulators 28 and 30 take up the pressure fluid discharged from the wheel brakes 32 and 34, and 36 and 38, respectively.

Because additional braking pressure must be built up at least in a part of the wheel brakes during active braking operations, the return pumps 4 and 6 are constructed for the automatic aspiration of pressure fluid. As long as pressure fluid prevails in the low-pressure accumulators 28 and 30, it can be taken for braking pressure build-up.

When it is assumed that one of the low-pressure accumulators, say, the low-pressure accumulator 28 of brake circuit I, has been exhausted, the return pump 4 requires the supply of pressure fluid from other sources for active braking operations. Interruption of the suction line 8 to the brake line 12 must absolutely be prevented in this case. When a hydraulically operated change-over valve 20 is provided, the above-mentioned condition is by any means ensured without the application of the brake pedal. However, a disadvantage in a hydraulic change-over valve of this type is that the suction line 8 can only be closed when master cylinder pressure is actually applied. For active braking operations, when the master cylinder 1 is pressurized and the low-pressure accumulator is exhausted, the electrically operated change-over valve 16 must be induced to adopt its open position shown. In the absence of a hydraulically operated change-over valve, this provision applies to the electrically operated change-over valve 16 also when the master cylinder is unpressurized. A master cylinder pressure which closes the hydraulically operated change-over valve develops, for example, by actuation of the brake pedal 3 or by precharging of the brake circuits I and II by way of an independently actuatable brake power booster or a precharging pump (not shown) which develops pressure on the master cylinder side of the change-over valve 16.

The return pumps 4 and 6 (as shown) may be driven by a joint motor, or each pump may be driven by a motor of its own (which would be more expensive).

The present invention provides using the rotational speed or the current signal of the pump drive motor(s) in order to identify the filling level of the low-pressure accumulator. When the return pump cannot aspirate and supply fluid volume because the low-pressure accumulator is empty, its power consumption will drop. The pump idles. This also reduces the current consumption of the drive motor. The rotational speed of the drive motor will then rise due to the reduced load torque. When both return pumps 4 and 6 are driven by a joint motor, the effect is correspondingly reduced when only one of the low-pressure accumulators is empty and fluid volume can still be supplied from the other accumulator. The assignment as to which one of the two low-pressure accumulators is empty may then be effected by plausibility checks following a memorized pattern stored in the computer. The memorized pattern permits an approximate calculation of the volume which is instantaneously contained in the low-pressure accumulators, for example, by way of valve actuations and the pump operation of the brake system.

The less time it takes to make the calculation by way of a pattern to identify a condition, the less exact the result normally is. In a memorized pattern, this may cause the pattern to drift from reality in the course of the control. Therefore, it may occur that a filling level of the low-pressure accumulator is still diagnosed by way of the pattern which no longer exists in reality. In this case, an evaluation of the rotational speed of the drive motor or the current consumption of the drive motor of the return pump can provide an adaptation between pattern and reality.

In the normal case, a pattern of this type will permit ensuring a sufficient pressure fluid supply through the corresponding suction lines 8 and 10 already prior to a complete exhaustion of the low-pressure accumulator.

It is self-explanatory that with separate drive motors for the individual return pumps, there is no need for an assignment by way of plausibility considerations. However, a memorized pattern is expedient as a preventive measure also in this case in order to ensure a sufficient pressure fluid supply.

We claim:

1. A method of operating a hydraulic brake system which is equipped for active braking and includes the following components:

a pedal-operated master cylinder which is connected to a supply reservoir and supplies fluid to at least one brake circuit by way of a brake line to which at least one wheel brake is connected, a low-pressure accumulator which is connected to the wheel brake by way of a return line, a self-priming return pump which has a connection to the low-pressure accumulator via a first suction line and to the brake line via a second suction line, and the pressure side of the pump being connected by a pressure line to the brake line between the connections of the second suction line and the wheel brake, a separating valve in the brake line between the connections to the second suction line and the pressure line, an inlet valve in the brake line between the connections of the pressure line and the wheel brake, an outlet valve in the return line, an electrically operated change-over valve in the second suction line, the said electrically operated change-over valve being opened during active braking operations in case of a requirement of additional brake fluid, wherein the requirement is determined by evaluating at least one quantity out of the group consisting of rotational speed and current consumption of the drive motor of the return pump.

2. The method as claimed in claim 1, wherein the requirement is determined by calculating a respective filling level of the low-pressure accumulator by way of a memorized pattern.

3. The method as claimed in claim 2, wherein one joint drive motor is used for several return pumps supplying different brake circuits, each including a low-pressure accumulator, and wherein it is identified by plausibility calculations by way of the memorized pattern if any and which one of the low-pressure accumulators is exhausted.

* * * * *